United States Patent [19]

Watanabe et al.

[11] Patent Number: 5,093,442

[45] Date of Patent: Mar. 3, 1992

[54] METHOD FOR PRODUCING A HOMOPOLYMER OR COPOLYMER OF AN ALPHA-OLEFIN

[75] Inventors: Harumi Watanabe; Shigeo Tsuyama, both of Kurashiki, Japan

[73] Assignee: Asahi Kasei Kogyo Kabushiki Kaisha, Osaka, Japan

[21] Appl. No.: 416,641

[22] Filed: Oct. 3, 1989

[30] Foreign Application Priority Data

Oct. 3, 1988 [JP] Japan .................. 63-247477
Oct. 3, 1988 [JP] Japan .................. 63-247478

[51] Int. Cl.$^5$ .................. C08F 4/654; C08F 4/656; C08F 10/00
[52] U.S. Cl. .................. 526/128; 502/119; 502/125; 526/127; 526/348.6; 526/351; 526/902; 525/268
[58] Field of Search .............. 526/124, 142, 128, 127

[56] References Cited

U.S. PATENT DOCUMENTS

| | | |
|---|---|---|
| 4,159,256 | 6/1979 | Sakurai et al. . |
| 4,159,963 | 7/1979 | Sakurai et al. .................. 526/127 |
| 4,329,253 | 5/1982 | Goodall et al. .................. 526/125 |
| 4,522,930 | 6/1985 | Albizzati et al. .................. 526/125 |
| 4,654,318 | 3/1987 | Yamamoto et al. .................. 526/124 |
| 4,657,882 | 4/1987 | Karayannis et al. .................. 526/125 |

FOREIGN PATENT DOCUMENTS

| | | |
|---|---|---|
| 0147053 | 7/1985 | European Pat. Off. . |
| 0193281 | 9/1986 | European Pat. Off. . |
| 2371463 | 6/1978 | France . |
| 1586267 | 3/1981 | United Kingdom . |

*Primary Examiner*—Edward J. Smith
*Attorney, Agent, or Firm*—Birch, Stewart, Kolasch & Birch

[57] ABSTRACT

A method for producing a homopolymer or copolymer of an α-olefin is disclosed, wherein a specific catalyst is used, said catalyst comprising a solid catalyst component obtained by contacting, in the presence of a chlorinated hydrocarbon solvent, a titanium compound and an aromatic carboxylic ester with a solid component obtained by reacting a hydrocarbon solvent-soluble organomagnesium compound having an alkoxy group with a specified chlorosilane compound having an Si—H bond; an organoaluminum compound; and an alkoxysilane compound. By the method of the present invention, an α-olefin homopolymer or copolymer exhibiting high bulk density and stereoregularity can be efficiently produced under even such polymerization reaction conditions, that the polymerization temperature is high and the polymerization time is long.

10 Claims, No Drawings

METHOD FOR PRODUCING A HOMOPOLYMER OR COPOLYMER OF AN ALPHA-OLEFIN

BACKGROUND OF THE INVENTION

1. Field of the Invention

The present invention relates to a method for producing a homopolymer or copolymer of an α-olefin. More particularly, the present invention is concerned with a method for producing a homopolymer or copolymer of an α-olefin in which a specific catalyst is used, said catalyst comprising a solid catalyst component obtained by contacting, in the presence of a chlorinated hydrocarbon solvent, a titanium compound and an aromatic carboxylic ester with a solid component obtained by reacting a hydrocarbon solvent-soluble organomagnesium compound having an alkoxy group with a specified chlorosilane compound having an Si—H bond; and organoaluminum compound; and an alkoxysilane compound. By the method of the present invention, an α-olefin homopolymer or copolymer exhibiting high bulk density and stereoregularity can be efficiently produced even under such polymerization reaction conditions, such that the polymerization temperature is high and the polymerization time is long.

2. Discussion of Related Art

It is well known in the art that a catalyst system comprising a titanium halide and an organoaluminum compound, such as triethylaluminum and diethylaluminum chloride, is useful for commercial production of an α-olefin polymer having high stereoregularity.

Further, various catalyst systems comprising a solid component composed of magnesium chloride, a titanium halide and a carboxylic ester, triethylaluminum and an electron donor, have heretofore been proposed as highly active catalyst systems which are useful for commercial production of an α-olefin polymer having high stereoregularity. For example, it was proposed in U.S. Pat. No. 4,156,063 to use a catalyst system comprising a solid catalyst component composed of activated $MgCl_2$, a titanium halide and a carboxylic ester; an organoaluminum compound; and a carboxylic ester. However, the polymerization catalytic activity of this catalyst system per unit weight thereof is not sufficiently high so as to be commercially useful, and also the polymer obtained using this catalyst system does not have a satisfactorily high stereoregularity.

As disclosed in U.S. Pat. No. 4,159,256, the present inventors previously found that a polymer having high stereoregularity is obtained in high yields by the use of a catalyst system comprising a solid catalyst component obtained by reacting a titanium halide and a carboxylic ester with an alkyl group-containing magnesium halide obtained by reacting an organomagnesium component with a chlorosilane compound having a Si—H bond; a carboxylic ester; and an organoaluminum compound.

Moreover, as disclosed in Japanese Patent Application Publication Specification No. 60-11924, the present inventors found that, with respect to a catalyst system comprising the above-mentioned solid catalyst component, an alkoxysilane and an organoaluminum compound, the degree of lowering of the catalytic activity with time is advantageously small.

On the other hand, in EP-A-45,977, it is described therein that when a catalyst system comprising the above-mentioned type of solid catalyst component containing a specific carboxylic ester, such as a phthalic diester, an alkoxysilane and an organoaluminum compound is used, the catalyst system exhibits markedly increased activity, and by the use of this catalyst system, a final polymer having markedly enhanced stereoregularity can be obtained. In the specification of EP-A-45,977, use is described of, for example, a solid catalyst component prepared by introducing anhydrous magnesium chloride, an aromatic carboxylic diester and titanium tetrachloride into a ball mill apparatus, in which the feedstock components are pulverized for a prolonged period of time, and then suspending the resultant pulverized mixture in 1,2-dichloroethane, followed by heating.

Furthermore, in EP-A-156,512, it is described that when a solid catalyst component prepared by effecting a reaction of a hydrocarbon-soluble dialkoxymagnesium not containing any alkyl group, an electron donor and hydrochlorosilane to obtain a solid component and subjecting the obtained solid component to a reaction with a titanium compound is used, a polymer having high bulk density and stereoregularity can be produced in high yields.

While the above-mentioned conventional catalyst systems have a high catalytic activity for producing a homopolymer or copolymer of an α-olefin which has relatively high stereoregularity, these systems have inherent problems which limit their applications. For example, when the above-mentioned conventional catalyst systems are applied to a liquid polymerization or gas phase polymerization of propylene (at temperatures of 75° C. or higher), the polymerization catalytic activities of the catalyst systems are not satisfactorily high, and the stereoregularity and bulk density of the final polymer are also not satisfactorily high. Further, when a block copolymerization of propylene with another monomer is performed using the above-mentioned conventional catalyst systems, it is likely that the formed copolymer particles will be sticky which would cause the agitation of the reaction mixture to become difficult and hence the block copolymerization cannot be continued.

SUMMARY OF THE INVENTION

Researches have been made in order to improve the catalysts disclosed in U.S. Pat. No. 4,159,256 and Japanese Patent Application Publication Specification No. 60-11924. That is, researches have been made with a view toward developing a catalyst which has a further improved polymerization catalytic activity and can advantageously be used for the producing an α-olefin polymer having a further improved bulk density and stereoregularity. Especially, extensive and intensive studies have been made in order to develop a catalyst which exhibits a high polymerization catalytic activity and produces a polymer having high bulk density and high stereoregularity, even under high polymerization temperatures.

The polymerization at high temperatures is desired because the temperature increase by polymerization heat can readily be suppressed by the heat of vaporization of a solvent and/or a monomer (in other words, polymerization heat removal efficiency is high), and because it becomes possible to effectively practice a gas phase polymerization, which is advantageous from the viewpoint of high productivity of the method and omission of refrigerating facilities.

High bulk density is desired from the viewpoint of the facilitation of handling of granular polymers. It is desired that the bulk density be at least 0.30, preferably in the range of from 0.40 to 0.55 g/cc. High stereoregularity, especially high isotactic stereoregularity, is desired from the viewpoint of the applicability of α-olefin polymers to the field of engineering plastics. Boiling heptane insolubles content, which is described later, is used as an index for stereoregularity. It is desired that the boiling heptane insolubles content be at least 94%, preferably at least on 96%.

Moreover, extensive and intensive studies have been made in order to develop a catalyst, the degree of lowering, with polymerization time, of the catalytic activity of which is advantageously small, and hence which can advantageously be used in a block polymerization in which monomers must remain in a reactor for a prolonged period of time. As a result, the present inventors have found that such an excellent catalyst can be obtained by combining a solid catalyst component (which is obtained by contacting, in the presence of a chlorinated hydrocarbon solvent, a titanium compound and an aromatic carboxylic ester with a solid component obtained by reacting a hydrocarbon solvent-soluble organomagnesium compound having an alkoxy group with a chlorosilane compound having an Si—H bond), with an organoaluminum compound and an alkoxysilane compound. The present inventors have further found that when the above-mentioned solid catalyst component is further treated with a titanium compound and then combined with an organoaluminum compound and an alkoxysilane compound, the resultant catalyst exhibits a further excellent catalytic performance. The present invention has been completed, based on these novel findings.

Accordingly, it is a principal object of the present invention to provide an improved method for efficiently producing a homopolymer or copolymer of an α-olefin which exhibits satisfactorily high bulk density and stereoregularity, even under polymerization reaction conditions such that the polymerization temperature is high and the polymerization time is long.

The foregoing and other objects, features and advantages of the present invention will be apparent from the following detailed description and appended claims.

DETAILED DESCRIPTION OF THE INVENTION

According to the present invention, there is provided a method for producing a homopolymer or copolymer of an α-olefin, which comprises homopolymerizing an α-olefin, or copolymerizing an α-olefin with a comonomer in contact with a specific catalyst comprising components (A), (B) and (C).

Component (A) is a solid catalyst component obtained by contacting, in the presence of a chlorinated hydrocarbon solvent, (a) a titanium compound represented by the formula:

$$Ti(OR^5)_m D_{4-m} \quad (I)$$

wherein $R^5$ represents a hydrocarbon residue having 2 to 10 carbon atoms; D represents a halogen atom; and m is a number satisfying the relationship $0 \leq m \leq 4$, and (b) an aromatic carboxylic ester, with (c) a solid component obtained by reacting
(i) a hydrocarbon solvent-soluble organomagnesium compound represented by the formula:

$$(M)_\alpha (Mg)_\beta (R^1)_p (R^2)_q (OR^3)_r \quad (II)$$

wherein M represents a metal atom of group I, II or III of the Periodic Table; each of $R^1$, $R^2$ and $R^3$ independently represents a hydrocarbon residue having 2 to 20 carbon atoms; and each of α, β, p, q and r is independently a number satisfying the relationships:

$$0 \leq \alpha, \ 0 < \beta, \ 0 \leq p, \ 0 \leq q, \ 0 < r,$$

and $k\alpha + 2\beta = p + q + r$ wherein k is the valence of M, with (ii) a chlorosilane compound represented by the formula:

$$H_a SiCl_b R^4{}_{4-(a+b)} \quad (III)$$

wherein $R^4$ represents a hydrocarbon residue having 1 to 20 carbon atoms; and each of a and b is independently a number satisfying the relationships:

$$0 < a, \ 0 < b, \text{ and } a+b \leq 4.$$

Component (B) is an organoaluminum compound represented by the formula:

$$AlR^6{}_n Z_{3-n} \quad (IV)$$

wherein $R^6$ represents a hydrocarbon residue having 1 to 20 carbon atoms; Z represents a hydrogen atom, a halogen atom, a hydrocarbyloxy group or a siloxy group; and n is a number satisfying the relationship $$0 < n \leq 3.$$

Component (C) is an alkoxysilane compound represented by the formula:

$$R^7{}_s Si(OR^8)_{4-s} \quad (V)$$

wherein each of $R^7$ and $R^8$ independently represents a hydrocarbon residue having 1 to 20 carbon atoms; and s is a number satisfying the relationship $0 \leq s < 4$.

As described later, each of compounds (a), (b), (i), (ii), (B) and (C) can be independently a single compound or a mixture of compounds. In formulae (I), (II), (III), [IV] and (V) each of suffixes α, β, p, q, r, a, b, m, n and s may be an integer or a decimal fraction. When the formula is used to define a single compound, the suffix or suffixes is/are an integer. On the other hand, when the formula is used to define a mixture of compounds, the suffix or suffixes is/are a decimal fraction.

The reason for the improved catalytic activity of the catalyst to be used in the present invention has not yet been fully elucidated. However, the following presumptions are made. First, it is presumed that when solid component (c) of solid catalyst component (A), which comprises a chlorinated magnesium compound having an alkyl group and an alkoxy group (which serves as a carrier), is prepared by the reaction of organomagnesium compound (i) having an alkoxy group with chlorosilane compound (ii), magnesium chloride as a constituent of the solid component is formed as fine crystals, said solid catalyst component (A) would have a large specific surface area and a high porosity, and that these characteristics would contribute to the improved activity of the catalyst. Secondly, it is presumed that by contacting titanium compound (a) and aromatic carboxylic ester (b) with solid component (c) in the presence of a chlorinated hydrocarbon solvent, polymerization active sites would be effectively formed without the formation of a complex of a titanium halide with a carboxylic ester, which complex does not inherently have a catalytic activity and is likely to be undesirably adsorbed on the surface of solid component (c), and that this would contribute to the improved activity of the catalyst. Moreover, it is presumed that the above-presumed phenomena would exert a synergistic effect to thereby provide a catalyst exhibiting high activity and to produce a polymer having high stereoregularity, even under polymerization reaction conditions such that monomers are heated at a high temperature for a prolonged period of time.

The hydrocarbon solvent-soluble organomagnesium compound represented by formula II: $(M)_\alpha(Mg)_\beta(R^1)_p(R^2)_q(OR^3)_r$ (wherein, $\alpha$, $\beta$, p, q, r, M, $R^1$, $R^2$ and $R^3$ have the same meanings as defined above) to be used as component (i) will be described in detail hereinbelow.

In the above-mentioned formula, $\alpha$, $\beta$, p, q and r satisfy the relationship represented by the equation: $k\alpha + 2\beta = p + q + r$, wherein k is the valence of metal atom M. This equation illustrates the stoichiometric relationship between the valences of metal atoms and substituent groups.

As mentioned hereinbefore, $0 \leq \alpha$. When $\alpha$ is zero, the magnesium compound does not contain any metal other than Mg. When $\alpha$ is larger than 0, the magnesium compound contains metal atom M in addition to Mg. As usable metal atom M, any element of group I, II or III of the Periodic Table can be used. For example, lithium, sodium, potassium, beryllium, zinc, boron, aluminum and the like can be used. Of these metals, aluminum and zinc are the most preferred.

The atomic ratio ($\beta/\alpha$) of magnesium to metal atom M is not specifically restricted. However, the atomic ratio ($\beta/\alpha$) is generally in the range of from 0.1 to 30, preferably from 1 to 20.

An explanation is given below with respect to the hydrocarbon residues $R^1$ and $R^2$ and the alkoxy group $OR^3$ of organomagnesium compound (i) represented by formula $(M)_\alpha(Mg)_\beta(R^1)_p(R^2)_q(OR^3)_r$.

Preferred examples of $R^1$ and $R^2$ depend on whether $\alpha$ is zero or larger than zero, whereas preferred examples of $R^3$ do not depend on whether $\alpha$ is zero or larger than zero.

When $\alpha$ is zero, it is preferred that the $R^1$ and $R^2$ satisfy either of following requirement (1), (2) or (3).

(1) At least one of $R^1$ and $R^2$ is a secondary or tertiary alkyl group having 4 to 6 carbon atoms. Preferably, both of $R^1$ and $R^2$ are alkyl groups having 4 to 6 carbon atoms, and at least one of $R^1$ and $R^2$ is a secondary or tertiary alkyl group.

(2) $R^1$ and $R^2$ are each an alkyl group having a different number of carbon atoms. Preferably, $R^1$ is an alkyl group having 2 to 3 carbon atoms, and $R^2$ is an alkyl group having at least 4 carbon atoms.

(3) At least one of $R^1$ and $R^2$ is a hydrocarbon residue having at least 6 carbon atoms. Preferably, both $R^1$ and $R^2$ are each an alkyl group having at least 6 carbon atoms.

Representative examples of secondary and tertiary alkyl groups having 4 to 6 carbon atoms mentioned in item (1) above include a sec-butyl group, a tert-butyl group, a 2-methylbutyl group, a 2-ethylpropyl group, a 2,2-dimethylpropyl group, a 2-methylpentyl group, a 2-ethylbutyl group, a 2,2-dimethylbutyl group, a 2-methyl-2-ethylpropyl group and the like. Of these, the sec-butyl group is most preferred.

Representative examples of alkyl groups having 2 or 3 carbon atoms mentioned in requirement (2) include an ethyl group and a propyl group. Of these, the ethyl group is most preferred. Examples of alkyl groups having at least 4 carbon atoms include a butyl group, an amyl group, a hexyl group, an octyl group and the like. Of these, the butyl group and the hexyl group are the most preferred.

Representative examples of hydrocarbon residues having at least 6 carbon atoms mentioned in requirement (3) include an alkyl group, such as a hexyl group, an octyl group and a decyl group, and an aryl group, such as a phenyl group. Of these, the alkyl group is more preferred, and the hexyl group of the alkyl group is most preferred.

Generally, the larger the number of carbon atoms contained in the alkyl group, the higher the solubility of the organomagnesium compound in a hydrocarbon solvent. However, then, the viscosity of the resultant organomagnesium compound solution becomes unfavorably high, it is not preferable that the number of carbon atoms of the alkyl group be too large. From the standpoint of ease in handling, it is preferred that the number of carbon atoms of the alkyl group do not exceed about 10.

On the other hand, when $\alpha$ is larger than 0, generally, each of $R^1$ and $R^2$ (each defined as a hydrocarbon residue) independently represents an alkyl group having 1 to 10 carbon atoms, a cycloalkyl group having 6 to 10 carbon atoms and an aryl group having 6 to 10 carbon atoms. The alkyl group is preferred. Examples of such hydrocarbon residues include a methyl group, an ethyl group, a propyl group, a butyl group, an amyl group, a hexyl group, a decyl group, a cyclohexyl group, a phenyl group and the like.

With respect to the alkoxy group represented by $OR^3$ which is contained in the organomagnesium compound (i) to be used in the present invention, an explanation is given below. As mentioned hereinbefore, preferred examples of $R^3$ do not depend on whether $\alpha$ is zero or larger than zero.

As hydrocarbon residues represented by $R^3$, an alkyl group having 3 to 10 carbon atoms and an aryl group having 6 to 10 carbon atoms are preferred. Representative examples of hydrocarbon residues include an n-propyl group, an n-butyl group, a secpropyl group, a sec-butyl group, a tert-butyl group, an amyl group, a 2-methylpentyl group, a 2-ethylhexyl group, an octyl group, a decyl group, a phenyl group and the like.

The above-mentioned organomagnesium compound (i) is a hydrocarbon solvent-soluble complex of an organomagnesium having an alkoxy group. The compound (i) can be prepared by reacting a hydrocarbon solvent-soluble organomagnesium complex (x) of formula $(M)_\alpha(Mg)_\beta(R^1)_p(R^2)_q$ (wherein $\alpha$, $\beta$, p and q are as defined above) with an alcohol having a hydrocarbon residue represented by $R^3$ as defined above, or by mixing hydrocarbon solvent-soluble organomagnesium complex (x) with a hydrocarbon solvent-soluble hydrocarbyloxymagnesium compound having a hydrocarbon residue represented by $R^3$ as defined above.

The suffixes $\alpha$, $\beta$, p and q satisfy the relationship represented by the equation: $k\alpha + 2\beta = p + q$. This equation shows the stoichiometric relationship between the valences of metal atom M and substituent groups.

Organomagnesium complex (x) can be obtained by reacting an organomagnesium compound (v) represented by formula $R^1{}_2Mg$ (wherein $R^1$ has the same meaning as defined above) with an organometallic compound represented by formula $MR^2{}_k$ or $MR^2{}_{k-1}H$ (wherein, M, $R^2$ and k have the same meanings as mentioned above) in the presence of an inert hydrocarbon solvent, such as hexane, heptane, cyclohexane, benzene and toluene, at a temperature of from room temperature to 150 °C.

When hydrocarbon solvent-soluble organomagnesium complex (x) is reacted with an alcohol having a hydrocarbon residue represented by $R^3$ to prepare organomagnesium compound (i), the reaction may be conducted in the presence of an inert reaction solvent, for example, an aliphatic hydrocarbon, such as n-hexane and n-heptane; an aromatic hydrocarbon, such as benzene, toluene and xylene; an alicyclic hydrocarbon, such as cyclohexane and methylcyclohexane; or a mixture thereof. For conducting the reaction between organomagnesium complex (x) and an alcohol, the alcohol may be added to an inert solvent solution of organomagnesium complex (x). Alternatively, organomagnesium complex (x) may be added to a mixture of an alcohol with an inert solvent. Further, both an alcohol and an organomagnesium complex may be simultaneously added to an inert reaction solvent. The molar ratio of hydrocarbon solvent-soluble organomagnesium complex (x) to the alcohol is not specifically restricted as long as the reaction product is soluble in a hydrocarbon solvent and some alkyl groups of the organomagnesium complex remain unreacted. Preferably, the molar ratio of organomagnesium complex (x) to the alcohol may be chosen so that the value calculated according to the formula: $r/(\alpha+\beta)$, wherein r, $\alpha$ and $\beta$ have the same meanings as defined above, can be greater than 0 and smaller than 2.5, more preferably greater than 0.5 and smaller than 2.2.

Next, an explanation is given below, with respect to chlorosilane compound (ii) having an Si—H bond, which is represented by the formula: $H_aSiCl_bR^4{}_{4-(a+b)}$, wherein a, b and R have the same meanings as defined above. The hydrocarbon residue $R^4$ indicated in the above-mentioned formula may preferably have 1 to 10 carbon atoms. Representative examples of hydrocarbon residues $R^4$ include an alkyl, such as a methyl group, an ethyl group, a propyl group, a butyl group, an amyl group, hexyl and decyl; a cycloalkyl group, such as a cyclohexyl group; an aryl group, such as a phenyl group; and the like. Of these, alkyl group, such as a methyl group, an ethyl group and a propyl group, are most preferred. In the above-mentioned formula, a and b each are independently a number larger than 0 and satisfy the formula: $a+b \leq 4$. It is most preferred that b be 2 or 3.

Representative examples of chlorosilane compounds include $HSiCl_3$, $HSiCl_2CH_3$, $HSiCl_2C_2H_5$, $HSiCl_2n$-$C_3H_7$, $HSiCl_2iso$-$C_3H_7$, $HSiCl_2n$-$C_4H_9$, $HSiCl_2C_6H_5$, $HSiCl_2(4$-$Cl$—$C_6H_4)$, $HSiCl_2CH$=$CH_2$, $HSiCl_2CH_2C_6H_5$, $HSiCl_2(1$-$C_{10}H_7)$, $HSiCl_2CH_2CH$=$CH_2$, $H_2SiClCH_3$, $H_2SiClC_2H_5$, $HSiCl(CH_3)_2$, $HSiCl(C_2H_5)_2$, $HSiClCH_3(iso$-$C_3H_7)$, $HSiClCH_3(C_6H_5)$, $HSiCl(C_6H_5)_2$ and the like. These chlorosilane compounds may be used individually or in combination. Of these, more preferred are trichlorosilane ($HSiCl_3$), monomethyldichlorosilane ($HSiCl_2CH_3$), dimethylchlorosilane [$HSiCl(CH_3)_2$], and ethyldichlorosilane: $HSiCl_2C_2H_5$. The most preferred are trichlorosilane and monomethyldichlorosilane.

Next, an explanation is made with respect to the reaction between hydrocarbon solvent-soluble organomagnesium compound (i) and chlorosilane compound (ii). Prior to the reaction between the organomagnesium compound and the chlorosilane compound, chlorosilane compound (ii) which is generally liquid, is preferably diluted with an inert reaction solvent, for example, an aliphatic hydrocarbon, such as n-hexane and n-heptane, an alicyclic hydrocarbon, such as cyclohexare and methylcyclohexane, or a chlorinated hydrocarbon, such as 1,2-dichloroethane, o-chlorobenzene and dichloromethane, or a mixture thereof. A solution obtained by dissolving organomagnesium compound (i) in a hydrocarbon solvent mentioned hereinbefore and the above-mentioned diluted chlorosilane compound (ii) are mixed together and heated, thereby obtaining a solid component which is separated from the mixture by precipitation. The reaction temperature is not specifically restricted. Generally, however, in order to accelerate the reaction, the reaction is conducted at a temperature of 40 °C. or higher. From the viewpoint of having a stable reaction, it is preferred that the reaction temperature be lower than the boiling point of the reaction solvent. With respect to the proportions of organomagnesium compound (i) and chlorosilane compound (ii), it is preferred that 0.01 to 100 moles, more preferably 0.1 to 10 moles of the chlorosilane compound (ii) be used relative to one mole of organomagnesium compound (i).

Solid component (c) thus formed as a reaction product in the reaction mixture is then contacted with titanium compound (a) and aromatic carboxylic ester (b), in the presence of a chlorinated hydrocarbon solvent as will be described later. It is preferred that before contacting solid compound (c) with titanium compound (a) and aromatic carboxylic ester (b), solid component (c) obtained by the above-mentioned reaction be separated from the reaction mixture by filtration or decantation, and sufficiently washed with an inert organic solvent, such as n-hexane and n-heptane to thereby remove unreacted materials and by-products from the solid component. The washing of the solid product may alternatively be conducted by a method in which the solid substance is washed with a chlorinated hydrocarbon at least one time and, then, washed sufficiently with an inert organic solvent, such as n-hexane and n-heptane.

The composition and the structure of solid component (c) vary depending on the types of the starting materials and the reaction conditions. The analysis of the composition shows that solid component (c) is a chlorinated magnesium compound having about 0.5 to 1.5 millimoles of Mg—C bond and about 0.5 to 3.0 millimoles of alkoxy group, per gram of the solid component.

Solid component (c) is contacted in the presence of a chlorinated hydrocarbon solvent with titanium compound (a) and an aromatic carboxylic ester (b), thereby obtaining solid catalyst component (A). Solid catalyst component (A) has an extremely large specific surface area, that is, a specific surface area of 100 to 600 $m^2/g$ as measured by the conventional B.E.T. method.

With respect to the titanium compound (a) represented by the formula: $Ti(OR^5)_mD_{4-m}$, wherein $R^5$, D and m have the same meanings as defined above, an explanation is given below. The hydrocarbon residue $R^5$ in the above-mentioned formula may be an alkyl group, such as a methyl group, an ethyl group, a propyl group, a butyl group, an amyl group, a hexyl group and a decyl group, a cycloalkyl group, such as a cyclohexyl group, or an aryl group, such as a phenyl group. Of these, an alkyl group is most preferred. Examples of titanium compounds include titanium tetrachloride, titanium tetrabromide, titanium tetraiodide, ethoxytitanium trichloride, propoxytitanium trichloride, butoxytitanium trichloride, dibutoxytitanium dichloride, tributoxytitanium monochloride and the like. Of these, titanium tetrachloride is most preferred.

As aromatic carboxylic ester (b) to be used for preparing the catalyst to be used in the present invention, an aromatic carboxylic monoester and an aromatic carboxylic diester are preferably used. Examples of aromatic carboxylic monoesters include methyl esters, ethyl esters, propyl esters and butyl esters of monocarboxylic acids, such as benzoic acid, p-toluic acid and p-methylbenzoic acid. Examples of aromatic carboxylic diesters include dicarboxylic diesters, such as dimethyl phthalate, diethyl phthalate, di-n-propyl phthalate, di-isopropyl phthalate, di-n-butyl phthalate, di-iso-butyl phthalate, di-n-heptyl phthalate, di-2-ethylhexyl phthalate and dioctyl phthalate. The above-mentioned aromatic carboxylic esters can be used individually or in combination.

As a method for contacting titanium compound (a) and aromatic carboxylic ester (b) with solid component (c) in order to prepare solid catalyst component (A) to be used in the present invention, any of the following methods may be used.

Method (I): solid component (c), titanium component (a) and aromatic carboxylic ester (b) are simultaneously contacted with one another.

Method (II): solid component (c) is contacted with titanium compound (a) and the resultant product is then contacted with aromatic carboxylic ester (b).

Method (III): solid component (c) is contacted with aromatic carboxylic ester (b) and the resultant product is then contacted with titanium compound (a).

Method (IV): titanium compound (a) is contacted with aromatic carboxylic ester (b) and the resultant product is then contacted with solid component (c).

In Method (I), the contact between solid component (c), titanium compound (a) and aromatic carboxylic ester (b) is conducted in the presence of a chlorinated hydrocarbon. In Methods (II) to (IV), the contact operation is conducted in the presence of a chlorinated hydrocarbon at least at the final step of each of the methods.

Of the above-mentioned methods, more preferred are Methods (I), (II) and (III), and the most preferred is Method (I).

The contact of components (a) and/or (b) with solid component (c), may be conducted in the liquid phase or in the gas phase. The contact in the liquid phase or gas phase may also be conducted while pulverizing the solid component.

Solid catalyst component (A) obtained by any of Methods (I) to (IV) may further be treated with titanium compound (a). By such a treatment, the catalytic activity of the resultant solid catalyst can be increased.

Hereinbelow, Methods (I) to (III) are further explained in detail.

Method (I)

Solid component (c), titanium compound (a) and aromatic carboxylic ester (b) are simultaneously contacted with one another.

Examples of chlorinated hydrocarbons to be copresent as a reaction medium in the reaction system include dichloromethane, 1,2-dichloroethane, n-butyl chloride, n-amyl chloride, 1,1,1-trichloroethane, 1,1,2-trichloroethylene, 1,1,2,2-tetrachloroethane, o-dichlorobenzene and the like. These chlorinated hydrocarbons may be used individually or in combination. Of these, 1,2-dichloroethane, n-butyl chloride and o-dichlorobenzene are more preferred.

The temperature and the titanium compound concentration in contacting components (a), (b) and (c) are not specifically restricted, but the upper limits of the temperature and the titanium compound concentration are varied depending the amount of a chlorinated hydrocarbon to be used as the reaction medium. For promoting the reaction by the contact between components (a), (b) and (c), it is preferred that the temperature be about 80° C. to about 250° C. and that the titanium compound concentration be from 2 moles to 9 moles per liter of the total of components (a), (b) and (c).

The volume of the chlorinated hydrocarbon to be used as a reaction medium may preferably be 0.1 to 2.0 times that of the titanium compound, more preferably, 0.2 to 1.0 times that of the titanium compound.

The ratio of titanium compound (a) to solid component (c) and the ratio of aromatic carboxylic ester (b) to solid component (c) are not specifically restricted. Generally, with respect to the titanium compound, 1 to 100 moles, preferably 5 to 50 moles, of the titanium compound per mole of the magnesium contained in solid component (c) may be used. On the other hand, with respect to the aromatic carboxylic ester, 0.01 to 1.0 mole, preferably 0.05 to 0.3 mole, of the aromatic carboxylic ester per mole of the magnesium contained in solid component (c) may be used.

The contact of solid component (c) with titanium compound (a) and aromatic carboxylic ester (b) may be conducted while pulverizing the solid component. The pulverization may be conducted mechanically by means of a rotary ball mill, an oscillating ball mill, an impact ball mill or the like, at a temperature of from 0° to 200° C., preferably from 10° to 150° C., for from 0.5 to 100 hours, preferably from 1 to 30 hours.

Method (II)

Solid component (c) is contacted with titanium compound (a) and the resultant product is then contacted with aromatic carboxylic ester (b).

The contact of solid component (c) with titanium compound (a) may be conducted in the copresence of a chlorinated hydrocarbon (an inert reaction medium) in the same manner as in Method (I). Alternatively, the contact may be conducted utilizing titanium compound (a) as a reaction medium, without using a chlorinated hydrocarbon.

In contacting solid component (c) with titanium compound (a), 1 to 100 moles, preferably 5 to 50 moles, of titanium compound per mole of the magnesium contained in the solid component may be used. The temperature is not specifically restricted. For promoting the reaction by the contact between components (c) and (a), it is preferred that the contact be conducted at a temperature of 40° C. or higher, but lower than the boiling point of the reaction solvent.

The solid product obtained by the contact between solid component (c) and titanium compound (a) is separated from the reaction mixture by filtration or decantation, washed sufficiently with an inert solvent, such as n-hexane and n-heptane, and then subjected to contacting with aromatic carboxylic ester (b). Alternatively, the reaction mixture (containing the solid product) as such may be subjected to contacting with aromatic carboxylic ester (b) without separating the solid product from the reaction mixture.

In the former case, an aromatic carboxylic acid ester may be added in an amount of from 0.01 to 1.0 mole, preferably from 0.1 to 0.5 mole per mole of the magnesium contained in solid component (c). The contact between the solid product and the aromatic carboxylic ester is conducted in the presence of a chlorinated hydrocarbon. As the chlorinated hydrocarbons, the same types of chlorinated hydrocarbons as described with respect Method (I) can be used. 1,2-Dichloroethane, n-butylchloride and o-dichlorobenzene are more preferred. The chlorinated hydrocarbons may be used individually or in combination. In the latter case, an aromatic carboxylic ester may be added in an amount of from 0.01 to 1.0 mole, preferably from 0.05 to 0.3 mole per mole of the magnesium contained in solid component (c). The contact between the solid product and the aromatic carboxylic ester (b) is conducted in the presence of a chlorinated hydrocarbon and also in the presence of a titanium compound in an excess amount relative to the amount of aromatic carboxylic ester (b) to be added, for example, in an amount about 200 times that of aromatic carboxylic ester (b).

The temperature employed in contacting the solid product with aromatic carboxylic ester (b) is not specifically restricted. For promoting the reaction, it is preferred that the contact be conducted at a temperature of 40° C. or higher, but lower than the boiling point of the reaction solvent.

A solid product obtained by the reaction of the solid product from solid component (c) and titanium compound (a) with aromatic carboxylic is separated from the reaction mixture by filtration or decantation and, preferably, washed sufficiently with an inert organic solvent, such as n-hexane and n-heptane.

Method (III)

Solid component (c) is contacted with aromatic carboxylic ester (b), and the resultant product is then contacted with titanium compound (a).

The contact between solid component (c) with aromatic carboxylic ester (b) may preferably be conducted in an inert reaction solvent. Examples of inert reaction solvents include an aliphatic hydrocarbon, such as n-hexane and n-heptane, an aromatic hydrocarbon, such as benzene, toluene and xylene, an alicyclic hydrocarbon, such as cyclohexane and methylcyclohexane, a chlorinated hydrocarbon, such as 1,2-dichloroethane, o-dichlorobenzene and dichloromethane, and the like. Of these, an aromatic hydrocarbon or a chlorinated hydrocarbon is more preferred. These inert reaction solvents may be used individually or in combination.

In contacting solid component (c) with aromatic carboxylic ester (b), an aromatic carboxylic ester may be used in an amount of from 0.01 to 1.0 mole, preferably from 0.1 to 0.5 mole per mole of the magnesium contained in solid component (c).

The temperature is not specifically restricted. For promoting the reaction, it is preferred that the contact be conducted at a temperature of 40° C. or more, but lower than the boiling point of the reaction medium.

The resultant solid product obtained by the contact between solid component (c) and aromatic carboxylic ester (b) be separated from the reaction mixture by filtration or decantation and, preferably, then washed sufficiently with an inert organic solvent, such as n-hexane and n-heptane, to thereby remove unreacted materials and by-products.

The solid product thus obtained is then contacted with titanium compound (a) in the presence of a chlorinated hydrocarbon in substantially the same manner as in Method (I). In contacting the solid product with titanium compound (a), the titanium compound may be used in an amount of from 1 to 100 moles, preferably from 5 to 50 moles per mole of the magnesium contained in the solid component.

It is preferred that the solid catalyst produced by each of Methods (I) to (III) be sufficiently washed with an inert organic solvent, such as n-hexane, n-heptane, toluene and cyclohexane, or washed first with a chlorinated hydrocarbon and, then, with an inert organic solvent, such as n-hexane, to thereby remove unreacted materials and by-products.

The solid catalyst component obtained by any of Methods (I) to (III) may further be treated with titanium compound (a) utilizing, as a reaction medium, the titanium compound per se. It is preferred that the thus treated solid catalyst be washed in the same manner as described above.

Thus, solid catalyst component (A) is obtained. The composition and structure of solid catalyst component (A) vary according to the compositions of the starting compositions (a), (b) and (c) and the contact conditions for the reaction between the components (a), (b) and (c). The analysis of the composition of solid catalyst component (A) shows that solid catalyst component (A) contains 1 to 10% by weight of titanium and has a specific surface area of 50 to 300 m²/g as measured by the B.E.T. method.

Next, an explanation is given with respect to organoaluminum compound (B).

Organoaluminum compound (B) is represented by the formula: $AlR^6_n Z_{3-n}$, wherein $R^6$, Z and n have the same meanings as defined above. That is, as the organoaluminum compound, a halogenated aluminum alkyl compound, a trialkylaluminum compound, a hydrocarbyloxyaluminum alkyl compound and a siloxy group-containing aluminum alkyl compound can be mentioned.

Examples of halogenated aluminum alkyl compounds include dimethylaluminum chloride, diethylaluminum chloride, di-n-propylaluminum chloride, di-n-butylaluminum chloride, di-iso-butylaluminum chloride, di-n-hexylaluminum chloride, di-iso-hexylaluminum chloride, di-(2-ethylhexyl)aluminum chloride, di-n-decylaluminum chloride, methylisobutylaluminum chloride, ethylisobutylaluminum chloride, methylaluminum sesquichloride, iso-butylaluminum sesquichloride, methylaluminum dichloride, ethylaluminum dichloride, isobutylaluminum dichloride, diethylaluminum bromide, diethylaluminum iodide and the like. These organoaluminum compounds may be used individually or in combination.

Examples of trialkylaluminum compounds include trimethylaluminum, triethylaluminum, tri-n-propylaluminum, tri-isopropylaluminum, tri-n-butylaluminum, tri-isobutylaluminum, tri-n-hexylaluminum, tri-n-octylaluminum, tri-n-decylaluminum, tri-n-dodecylaluminum, tri-n-hexadecylaluminum and the like. These compounds may be used individually or in combination.

As the hydrocarbyloxyaluminum alkyl compound, compounds obtained by reacting the above-mentioned trialkylaluminum compounds with an alcohol can be used. Examples of alcohols include methyl alcohol, ethyl alcohol, n- and iso-propyl alcohols, n-, iso-, sec- and tert-butyl alcohols, n-, iso-, sec- and tert-amyl alcohols, phenol, cersol and the like.

In practicing the reaction between the trialkylaluminum compound and an alcohol, the alcohol may be used in an amount of from 0.1 to 1 mole, preferably from 0.2 to 0.9 mole per mole of the trialkylaluminum compound.

As the siloxy group-containing aluminum alkyl compound, compounds obtained by reacting the above-mentioned trialkylaluminum compounds with a silanol derivative or a siloxane derivative can be mentioned. Examples of silanol derivatives include trimethylsilanol, triethylsilanol, tripropylsilanol, tributylsilanol, triphenylsilanol, hydrolyzates of a chlorosilane, a polysilanol and the like. Examples of siloxane derivatives include a methylhydrogen polysiloxane, an ethylhydrogen polysiloxane, a propylhydrogen polysiloxane, a butylhydrogen polysiloxane, a phenylhydrogen polysiloxane, a dimethylpolysiloxane, a methylethylpolysiloxane, a methylphenylpolysiloxane and the like.

In practicing the reaction between the trialkylaluminum compound and the silanol derivative or siloxane derivative, the silanol derivative or siloxane derivative may be used in an amount of from 0.1 to 2 moles, preferably from 0.2 to 1.5 moles, more preferably from 0.2 to 1.2 moles, in terms of the amount of Si, per mole of the trialkylaluminum.

Hereinbelow, an explanation is given with respect to alkoxysilane compound (C).

The alkoxysilane compound is represented by the formula: $R^7{}_s Si(OR^8)_{4-s}$, wherein $R^7$, $R^8$ and s have the same meanings as defined above.

Examples of alkoxysilane compounds of the above formula wherein s is 0, namely alkoxysilane compounds of formula: $Si(OR^8)_4$ include $Si(OCH_3)_4$, $Si(OC_2H_5)_4$, $Si(O-n-C_3H_7)_4$, $Si(O-iso-C_3H_7)_4$, $Si(O-n-C_4H_9)_4$, $Si(O-sec-C_4H_9)_4$ and the like.

Examples of alkoxysilane compounds of the above formula wherein s is 1, namely alkoxysilane compounds of formula: $R'Si(OR^8)_3$ wherein $R'$ is a hydrocarbon residue having 1 to 20 carbon atoms, include $CH_3Si(OCH_3)_3$, $C_2H_5Si(OC_2H_5)_3$, $n-C_4H_9Si(OCH_3)_3$, $n-C_5H_{11}Si(OCH_3)_3$, $C_6H_5Si(OCH_3)_3$, $C_6H_5CH_2Si(OCH_3)_3$, $CH_2=CHSi(OCH_3)_3$, $CH[Si(OCH_3)_3]_3$, $(CH_3O)_3SiCH_2Si(OCH_3)_3$, $(CH_3O)_3SiCH_2CH_2Si(OCH_3)_3$, $CF_3CH_2CH_2Si(OCH_3)_3$, $CCl_3Si(OCH_3)_3$, $CH_3CHClSi(OCH_3)_3$, $CH_2ClCH_2Si(OCH_3)_3$, $CH_3Si(OC_2H_5)_3$, $C_2H_5Si(OC_2H_5)_3$, $n-C_3H_7Si(OC_2H_5)_3$, $n-C_4H_9Si(OC_2H_5)_3$, $n-C_5H_{11}Si(OC_2H_5)_3$, $cyclo-C_6H_{11}Si(OC_2H_5)_3$, $C_6H_5Si(OC_2H_5)_3$, $CH_2=CHSi(OC_2H_5)_3$, $CH_3CH=CHSi(OC_2H_5)_3$, $CH_2=CHCH_2Si(OC_2H_5)_3$, $(C_2H_5O)_3SiCH_2Si(OC_2H_5)_3$, $CH[Si(OC_2H_5)_3]_3$, $CF_3C_6H_4Si(OC_2H_5)_3$, $CH_2ClSi(OC_2H_5)_3$, $CCl_3Si(OC_2H_5)_3$, $CH_2ClCH_2Si(OC_2H_5)_3$, $CH_2ClCHClSi(OC_2H_5)_3$, $CH_2=CHSi(O-iso-C_3H_7)_3$, $(iso-C_3H_7O)_3SiCH_2Si(O-iso-C_3H_7)_3$, $CH_3CHClSi(O-iso-C_3H_7)_3$, $CH_2ClCH_2Si(O-iso-C_3H_7)_3$, $CH_3Si(O-n-C_4H_9)_3$, $C_2H_5Si(O-n-C_4H_9)_3$, $C_6H_5Si(O-n-C_4H_9)_3$, $CH_2=CHSi(O-n-C_4H_9)_3$, $(n-C_4H_9O)_3SiCH_2Si(O-n-C_4H_9)_3$, $CH_3CHClSi(O-n-C_4H_9)_3$, $CH_2=CClSi(O-n-C_4H_9)_3$, $CH_3Si(O-iso-C_4H_9)_3$, $CH_2=CHSi(O-iso-C_4H_9)_3$, $(iso-C_4H_9O)_3SiCH_2Si(O-iso-C_4H_9)_3$, $CH_3CHClSi(O-iso-C_4H_9)_3$, $CH_2CClSi(O-iso-C_4H_9)_3$, $CH_3Si(O-sec-C_4H_9)_3$, $CH_2=CHSi(O-sec-C_4H_9)_3$, $(sec-C_4H_9O)_3SiCH_2Si(O-sec-C_4H_9)_3$, $CH_3CHClSi(O-sec-C_4H_9)_3$, $CH_2=CClSi(O-sec-C_4H_9)_3$, $C_6H_5Si(O-sec-C_4H_9)_3$, $CH_3Si(O-tert-C_4H_9)_3$, $C_6H_5Si(O-tert-C_4H_9)_3$ and the like.

Examples of alkoxysilane compounds of the above formula wherein s is 2, namely alkoxysilane compounds of formula:

$R'R''Si(OR^8)_2$ wherein each of $R'$ and $R''$ independently represents a hydrocarbon residue having 1 to 20 carbon atoms, include $(CH_3)_2Si(OCH_3)_2$, $(C_2H_5)_2Si(OCH_3)_2$, $(n-C_3H_7)_2Si(OCH_3)_2$, $(n-C_4H_9)_2Si(OCH_3)_2$, $(n-C_5H_{11})_2Si(OCH_3)_2$, $(C_6H_5)_2Si(OCH_3)_2$, $(CH_3)_2Si(OC_2H_5)_2$, $(CH_3)(C_2H_5)Si(OC_2H_5)_2$, $(CH_3)(C_6H_5)Si(OC_2H_5)_2$, $CH_3SiCl(OC_2H_5)_2$, $C_2H_5SiH(OC_2H_5)_2$, $(C_2H_5)_2Si(OC_2H_5)_2$ and the like.

Examples of alkoxysilane compounds of the above formula wherein s is 3, namely alkoxysilane compounds of formula: $R'R''R'''SiOR^8$ wherein each of $R'$, $R''$ and $R'''$ independently represents a hydrocarbon residue having 1 to 20 carbon atoms, include $(CH_3)_3SiOCH_3$, $(C_2H_5)_3SiOCH_3$, $(CH_3)_3SiOC_2H_5$, $(CH_3)_2(n-C_3H_7)SiOC_2H_5$, $(CH_3)_2(C_6H_5)SiOC_2H_5$, $(C_2H_5)_3SiO-n-C_3H_7$, $(CH_3)_3SiO-n-C_4H_9$ and the like.

Of the above-mentioned alkoxysilane compounds, $CH_3Si(OC_2H_5)_3$, $C_2H_5Si(OC_2H_5)_3$, $C_6H_5Si(OCH_3)_3$, $C_6H_5Si(OC_2H_5)_3$, $n-C_3H_7H_9Si(OC_2H_5)_3$, $n-C_4H_9Si(OC_2H_5)_3$, $n-C_5H_{11}Si(OC_2H_5)_3$, $(C_6H_5)_2Si(OCH_3)_2$ and $Si(OC_2H_5)_4$ are more preferred.

These alkoxysilane compounds may be used individually or in combination. Further, a product obtained by the reaction, such as addition reaction, of the above-mentioned alkoxysilane compound with an organoaluminum compound mentioned above may also be used as component (C). Moreover, a complex of the alkoxysilane compound with an ether, an ester, an amine or the like may be used in combination with the alkoxysilane compound.

By combining organoaluminum compound (B) with solid catalyst component (A) and alkoxysilane compound (C) as described below, a catalyst having high catalytic activity can be obtained. By the use of such a catalyst, a polyolefin or a copolymer of α-olefin and ethylene having high bulk density and stereoregularity can be obtained. Particularly when a trialkylaluminum compound or a dialkylaluminum halide is used as organoaluminum compound (B), a catalyst having the most excellent catalytic activity can be obtained. By the use of such a catalyst, a polyolefin or a copolymer of α-olefin and ethylene having the most excellent bulk density and stereoregularity can be obtained.

Components (A), (B) and (C) are used preferably in proportions such that the amount of component (B) is in the range of from 1 to 3000 mmol preferably in the range of from 5 to 1000 mmol, in terms of the amount of aluminum atoms in component (B), per g of component (A) and such that the amount of component (C) is in the range of from 0.01 to 1000 mmol, preferably in the range of from 0.05 to 100 mmol, in terms of the amount of silicon atoms in catalyst (C), per g of component (A).

Components (A), (B) and (C) may be simultaneously added to the polymerization system. Alternatively, components (A), (B) and (C) may be mixed prior to addition to the polymerization system. With respect the blending prior to addition, all of components (A), (B)

and (C) may be mixed or any two of components (A), (B) and (C) may be blended. The blending may be performed in either an inert gas atmosphere or an olefin atmosphere.

The method of the present invention is useful for stereoregular homopolymerization of an α-olefin and stereoregular copolymerization of an α-olefin with a comonomer (the homopolymerization and copolymerization are herein often collectively referred to simply as "polymerization"). The α-olefin is an olefin wherein the unsaturation (double bond) is at the alpha position, that is, between the two end carbons of the carbon chain. Representative examples of α-olefins include propylene, butene-1, pentene-1, 4-methylpentene-1 and 3-methylbutene-1. Particularly, the method of the present invention is useful for the homopolymerization or copolymerization of propylene. Further, in the method of the present invention, the decrease in the catalytic activity in the course of prolonged polymerization time is extremely small. Therefore, the method of the present invention is also useful for block copolymerization, represented by copolymerization of α-olefin with a comonomer, such as ethylene or other ethylenically unsaturated compounds, in which a relatively long residence time in the reactor is required In the method of the present invention, there may be employed a molecular weight modifier, such as hydrogen, a halogenated hydrocarbon and organometallic compounds which are likely to cause chain transfer.

With respect to the polymerization method, there is no particular limitation, and there may be employed suspension polymerization, liquid monomer bulk polymerization or gas phase polymerization. Particularly, liquid monomer bulk polymerization and gas phase polymerization, which are performed at relatively high temperatures, are preferably used.

When suspension polymerization is employed, the polymerization can be performed by introducing the catalyst into a reactor together with a polymerization solvent, e.g., an aliphatic hydrocarbon such as hexane and heptane, and then introducing an α-olefin such as propylene, under a pressure of 1 to 20 kg/cm$^2$ in an inert gas atmosphere, followed by reaction at room temperature or at an elevated temperature of up to 150° C. The amount of the catalyst is not critical. However, it is generally used in an amount of from 1 to 100 mg, in terms of the amount of component (A), per mole of the α-olefin. When liquid monomer bulk polymerization is employed, the polymerization can be performed by adding the catalyst to a liquid α-olefin and then effecting polymerization of the α-olefin under conditions such that the liquid α-olefin can maintain its liquid state. For example, when the α-olefin is propylene, the polymerization of liquid propylene can be performed at room temperature or at an elevated temperature of up to 90° C. under a pressure of 10 to 45 kg/cm$^2$. The amount of the catalyst is not critical. However, it is generally used in an amount of from 0.1 to 10 mg, per mole of the liquid α-olefin. When gas phase polymerization is employed, the polymerization can be performed by mixing an α-olefin, such as propylene, with the catalyst by means of a mixing means capable of attaining good contact between the catalyst and the α-olefin, such as a fluidized bed, a movable bed and a stirrer, in the absence of a solvent at room temperature or at an elevated temperature of up to 120° C. under a pressure of 1 to 50 kg/cm$^2$ under conditions such that the α-olefin can maintain a gaseous state.

The present invention will now be described in more detail with reference to the following Examples and Comparative Examples, which should not be construed to be limiting the scope of the present invention.

In Examples and Comparative Examples, various measurements or determinations are done as follows. The "boiling heptane insolubles content" is determined by measuring the amount of the residue remaining unextracted upon extraction of a polymer with boiling n-heptane, as expressed in terms of % by weight based on the weight of the polymer. The "bulk density" is measured in accordance with Japanese Industrial Standards (JIS) 6721. Quantitative analysis of catalyst components is performed by hydrolyzing a catalyst component sample by means of dilute sulfuric acid, separating the resultant solution into organic components and inorganic components and subjecting these components to gas chromatography and chemical analysis, respectively. The amount of hydrogen gas to be introduced into a polymerization system to attain a predetermined value (g/10 min) of melt flow index for a final polymer is determined from a calibration curve previously prepared on the basis of the relationship between the amount of hydrogen introduced and the melt flow index of the corresponding polymer formed. The melt flow index is measured in accordance with ASTM D1238.

EXAMPLE 1

(I) Synthesis of an alkoxy group-containing organomagnesium compound

Into a 1-liter flask flushed with nitrogen is introduced an n-heptane solution containing 250 mmol, in terms of the amount of magnesium, of an organomagnesium complex synthesized from triethyl aluminum and dibutyl magnesium and represented by formula AlMg$_6$(C$_2$H$_5$)$_3$(n-C$_4$H$_9$)$_{12}$. 11.4 cc (125 mmol) of n-butyl alcohol is added thereto dropwise by means of a dropping funnel over a period of 1 hour while stirring and cooling in an ice bath, thereby to effect reaction. Then, reaction is further performed at room temperature for 1 hour, thereby obtaining a relatively viscous, colorless transparent solution. When subjected to analysis, the solution is found to contain 0.48 mole of n-butoxy group per mole of Mg and have an Mg concentration of 1.0 mole/liter.

(II) Synthesis of a magnesium-containing solid component by the reaction with a chlorosilane compound Into a 1-liter flask flushed with nitrogen is introduced 500 mmol of trichlorosilane (HSiCl$_3$) in the form of an n-heptane solution at a trichlorosilane concentration of 1 mol/l. The total amount of the above-obtained solution containing an alkoxy group-containing organomagnesium component is added thereto over a period of 1 hour while stirring and maintaining a temperature of 65° C. Stirring is continued for 1 hour at 65° C., to effect reaction, thereby obtaining a white solid product. The white solid product is filtered off and well washed with n-hexane, followed by drying, thereby to obtain 29.5 g of a white solid product (A-1). When subjected to analysis, the solid product is found to have an Mg content of 7.45 mmol/g, a Cl content of 14.2 mmol/g, a butoxy group content of 1.92 mmol/g and an alkyl group content of 0.12 mmol/g, and a specific surface area of 218 m$^2$/g as measured in accordance with BET method.

(III) Synthesis of a solid catalyst component

Into a 500-cc flask flushed with nitrogen are introduced 10 g the solid component obtained in (II) above, 200 cc of titanium tetrachloride, 50 cc of 1,2-dichloroethane and 2.0 cc (7.5 mmol) of di-n-butyl phthalate, and reacted at 100° C. for 2 hours while stirring. Then, a solid product is filtered off, and suspended in 200 cc of tetrachlorotitanium and reacted at 120° C. for 2 hours while stirring. After the reaction, a solid product is separated by filtration while heating, well washed by heated n-heptane and further washed by n-hexane, thereby obtaining a solid catalyst component (B-1) in the form of an n-hexane slurry. When subjected to analysis, the solid catalyst component is found to have a Ti content of 2.1% by weight.

(IV) Polymerization of liquid propylene

Into a 1.5-liter autoclave flushed with nitrogen and well vacuum dried is introduced hydrogen gas so that the melt flow index (hereinafter referred to as MFI) of the final polymer becomes 5, and then 350 g of liquefied propylene is introduced thereto. The temperature of the autoclave is elevated to 80° C. and there are added n-hexane slurry (B-1) in an amount of 7 mg in terms of the solid catalyst component, 1.2 mmol of triethyl aluminum and 0.12 mmol of phenyl triethoxysilane, and reacted at 80° C. for 4 hours while stirring to effect polymerization, thereby obtaining 198 g of a polymer.

The solid catalyst component has an activity per gram of 28300 g-PP/g-Solid and an activity per unit time of 7070 g-PP/g-Solid.hr. Herein, PP means polypropylene.

The boiling heptane insolubles content of the polymer is 97.5%. The bulk density of the polymer powder is 0.48 g/cc.

EXAMPLE 2

Substantially the same procedure for the production of an alkoxy group-containing organomagnesium compound as in Example 1 is performed except that 49.3 cc (320 mmol) of 2-ethylhexyl alcohol is employed in place of 11.4 cc (125 mmol) of n-butyl alcohol, thereby obtaining an alkoxy group-containing organomagnesium compound containing 2-ethylhexyl groups in an amount of 1.25 mole/mole of Mg and having an Mg content of 1.0 mole/liter.

Then, using the above-obtained organomagnesium compound, synthesis of a solid catalyst component is performed in substantially the same manner as in Example 1, thereby obtaining an n-hexane slurry (B-2) containing a solid catalyst component containing Ti in an amount of 2.9% by weight.

(IV) Polymerization of liquid propylene

Into a 1.5-liter autoclave flushed with nitrogen and well vacuum dried is introduced hydrogen gas so that the MFI of the final polymer becomes 5, and then 350 g of liquefied propylene is introduced thereto. The temperature of the autoclave is elevated to 80° C. and there are added n-hexane slurry (B-2) in an amount of 7 mg in terms of the solid catalyst component, 1.2 mmol of triethyl aluminum and 0.12 mmol of phenyl triethoxysilane, and reacted at 80° C. for 4 hours while stirring to effect polymerization, thereby obtaining 278 g of a polymer.

The solid catalyst component has an activity per gram of 39700 g-PP/g-Solid and an activity per unit time of 9930 g-PP/g-Solid.hr.

The boiling heptane insolubles content of the polymer is 97.5%. The bulk density of the polymer powder is 0.44 g/cc.

COMPARATIVE EXAMPLE 1

Substantially the same procedure for the production of an n-hexane slurry as in Example 1 is performed except that 1,2-dichloroethane is not used, thereby obtaining an n-hexane slurry containing a solid product (C-1). When subjected to analysis, the solid product is found to contain Ti in an amount of 2.5% by weight/g.

(III) Polymerization of liquid propylene

Into a 1.5-liter autoclave flushed with nitrogen and well vacuum dried is introduced hydrogen gas so that the MFI of the final polymer becomes 5, and then 350 g of liquefied propylene is introduced thereto. The temperature of the autoclave is elevated to 80° C. and there are added n-hexane slurry (C-1) in an amount of 7 mg in terms of the solid catalyst component, 1.2 mmol of triethyl aluminum and 0.12 mmol of phenyl triethoxysilane, and reacted at 80° C. for 4 hours while stirring to effect polymerization, thereby obtaining 122 g of a polymer.

The solid catalyst component has an activity per gram of 17400 g-PP/g-Solid and an activity per unit time of 4350 g-PP/g-Solid.hr.

The boiling heptane insolubles content of the polymer is 96.2%. The bulk density of the polymer powder is 0.32 g/cc.

COMPARATIVE EXAMPLE 2

Substantially the same procedure for the production of an n-hexane slurry as in Example 1 is performed except that the organomagnesium compound of formula $AlMg_6(C_2H_5)_3(n-C_4H_9)_{12}$ is not reacted with an alcohol, thereby obtaining an n-hexane slurry containing a solid product (C-2). When subjected to analysis, the solid product is found to contain Ti in an amount of 1.5% by weight/g.

(III) Polymerization of liquid propylene

Into a 1.5-liter autoclave flushed with nitrogen and well vacuum dried is introduced hydrogen gas so that the MFI of the final polymer becomes 5, and then 350 g of liquefied propylene is introduced thereto. The temperature of the autoclave is elevated to 80° C. and there are added n-hexane slurry (c-2) in an amount of 7 mg in terms of the solid catalyst component, 1.2 mmol of triethyl aluminum and 0.12 mmol of phenyl triethoxysilane, and reacted at 80° C. for 4 hours while stirring to effect polymerization, thereby obtaining 92 g of a polymer.

The solid catalyst component has an activity per gram of 13100 g-PP/g-Solid and an activity per unit time of 3270 g-PP/g-Solid.hr.

The boiling heptane insolubles content of the polymer is 94.3%. The bulk density of the polymer powder is 0.26 g/cc.

COMPARATIVE EXAMPLE 3

A solid catalyst component is prepared in substantially the same manner as described in U.S. Pat. No. 4,156,063 except that as a carboxylate, di-n-butyl phthalate is employed. That is, 8.75 g of anhydrous magnesium chloride and 0.76 g of a complex of formula $TiCl_4.o\text{-}C_6H_4(COOC_4H_9)_2$ are milled in a glass-made mill containing a steel ball having a diameter of 9.5 mm and a weight of 550 g for 16 hours in a nitrogen atmosphere, thereby obtaining a solid catalyst component (C-3). Using the solid catalyst component (C-3), substantially the same polymerization as in Example 1 is performed, thereby obtaining 32 g of a polymer.

The solid catalyst component has an activity per gram of 4570 g-PP/g-Solid and an activity per unit time of 1140 g-PP/g-Solid.hr.

The boiling heptane insolubles content of the polymer is 91.2%. The bulk density of the polymer powder is 0.32 g/cc.

COMPARATIVE EXAMPLE 4

A solid catalyst component is prepared in the same manner as described in European Patent No. 45977. That is, anhydrous magnesium chloride, di-n-butyl phthalate and titanium tetrachloride mixed at a molar ratio of 1/0.125/0.125 are milled in a ball mill for 72 hours at 25 ° C. in a nitrogen atmosphere. 10 g of the resultant milled product is put into contact with 100 ml of 1,2-dichloroethane at 80 ° C., and the contact state and temperature are kept for 2 hours, followed by filtration while maintaining the temperature. The resultant solid product is well washed by n-heptane until the filtrate contains no chlorine ion, thereby obtaining an n-heptane slurry containing a solid catalyst component (C-4). Using the solid catalyst component (C-4), polymerization is performed in substantially the same manner as in Example 1, thereby obtaining 132 g of a polymer.

The solid catalyst component has an activity per gram of 18800 g-PP/g-Solid and an activity per unit time of 4700 g-PP/g-Solid.hr.

The boiling heptane insolubles content of the polymer is 93.1%. The bulk density of the polymer powder is 0.29 g/cc.

EXAMPLE 3

Substantially the same procedure for the production of an alkoxy group-containing organomagnesium compound as in Example 1 is performed except that the amount of n-butanol is changed to 22.8 cc (250 mmol), thereby obtaining an alkoxy group-containing organomagnesium component containing a butoxy group in an amount of 0.96 mole/mole of Mg and having an Mg content of 1.0 mole/liter.

Then, using the above-obtained organomagnesium compound, synthesis of a solid catalyst component is performed in substantially the same manner as in Example 1, thereby obtaining an n hexane slurry (B-3) containing a solid catalyst component containing Ti in an amount of 3.2% by weight.

(IV) Polymerization of liquid propylene

Into a 1.5-liter autoclave flushed with nitrogen and well vacuum dried is introduced hydrogen gas so that the MFI of the final polymer becomes 5, and then 350 g of liquified propylene is introduced thereto. The temperature of the autoclave is elevated to 80 ° C. and there are added n-hexane slurry (B-3) (in an amount of 7 mg in terms of the amount of solid catalyst component contained in the n-hexane slurry), 1.2 mmol of triethyl aluminum and 0.12 mmol of phenyl triethoxysilane, and reacted at 80 ° C. for 4 hours while stirring to effect polymerization, thereby obtaining 236 g of a polymer.

The solid catalyst component has an activity per gram of 33700 g-PP/g-Solid and an activity per unit time of 8420 g-PP/g-Solid.hr.

The boiling heptane insolubles content of the polymer is 97.0%. The bulk density of the polymer powder is 0.47 g/cc.

EXAMPLE 4

Substantially the same polymerization as in Example 1 is performed except that the solid catalyst component (B-3) is used, butene-1 is used as the monomer and the polymerization temperature is changed to 50 ° C., thereby obtaining 95 g of polybutene-1 polymer.

The solid catalyst component has an activity per gram of 13600 g-PB/g-Solid and an activity per unit time of 3400 g-PB/g-Solid.hr. Herein, PB means polybutene.

The diethyl ether insolubles content of the polymer is 97.5%. The bulk density of the polymer powder is 0.43 g/cc.

EXAMPLE 5

Into a 500-cc flask flushed with nitrogen are introduced 10 g of the solid product obtained in (II) of Example 3, 200 cc of titanium tetrachloride, 50 cc of 1,2-dichloroethane and 2.0 cc (7.5 mmol) of di-n-butyl phthalate, and reacted at 100 ° C. for 10 hours while stirring. After the reaction, a solid product is separated by filtration while heating, and well washed first with heated n-hexane and then with non-heated n-hexane, thereby obtaining a solid catalyst component (B-5) in the form of an n-hexane slurry. When subjected to analysis, the solid catalyst component is found to have a Ti content of 2.8% by weight.

Substantially the same polymerization as in Example 1 is performed except that use is made of the solid catalyst component (B-5), thereby obtaining 247 g of a polymer.

The solid catalyst component has an activity per gram of 35300 g-PP/g-Solid and an activity per unit time of 8820 g-PP/g-Solid.hr.

The boiling heptane insolubles content of the polymer is 97.5%. The bulk density of the polymer powder is 0.47 g/cc.

EXAMPLES 6 to 11

Substantially the same procedure for the production of a solid catalyst component as in Example 1 is repeated except that as an alkoxy group-containing organomagnesium component, materials indicated in Table 1 are employed, thereby obtaining solid catalyst components (B-6 to B-11). Substantially the same polymerization as in Example 1 is performed except that use is made of each of the thus obtained catalysts. The resultant polymers are subjected to analysis in the same manner as in Example 1. The results are shown in Table 1.

EXAMPLES 12 to 15

Substantially the same procedure for the production of a solid catalyst component as in Example 1 is repeated except that, as an aromatic carboxylate, materials indicated in Table 2 are employed, thereby obtaining solid catalyst components (B-12 to B-15). Substantially the same polymerization as in Example 1 is performed except that use is made of the each of thus-obtained catalysts. The resultant polymers are subjected to analysis in the same manner as in Example 1. The results are shown in Table 2.

EXAMPLES 16 to 18

Substantially the same polymerization of liquid propylene as in Example 3 is performed except that the organoaluminum compound and alkoxysilane compound are changed to those as indicated in Table 3. The resultant polymers are subjected to analysis in the same manner as in Example 1. The results are shown in Table 3.

EXAMPLE 19

Substantially the same procedure for the production of a solid catalyst component as in Example 1 is performed except that as a chlorohydrocarbon solvent, n-butylchloride is employed, thereby obtaining a solid catalyst component (B-19). Substantially the same polymerization as in Example 1 is performed except that use is made of the thus-obtained catalyst, thereby obtaining 238 g of a polymer.

The solid catalyst component has an activity per gram of 34000 g-PP/g-Solid and an activity per unit time of 8500 g-PP/g-Solid.hr.

The boiling heptane insolubles content of the polymer is 96.5%. The bulk density of the polymer powder is 0.45 g/cc.

EXAMPLE 20

Using the solid catalyst component (B-3) obtained in Example 3, block copolymerization of propylene and ethylene is performed in the following manner.

Into a 1.5-liter autoclave flushed with nitrogen and well vacuum dried is charged hydrogen gas so that the MFI of the final polymer becomes 5, and then 200 g of liquified propylene is introduced thereto. The temperature of the autoclave is elevated to 80 °C. and there are added n-hexane slurry (B-3) (in an amount of 7 mg in terms of the amount of solid catalyst component contained in the n-hexane slurry), 1.2 mmol of triethyl aluminum and 0.12 mmol of phenyl triethoxysilane, and reacted at 80 °C. for 2 hours while stirring to effect polymerization. After that period, propylene remaining unreacted is discharged. Then, the temperature of the autoclave is lowered to 50 °C. and an ethylenepropylene mixed gas (ethylene/propylene ratio: 1.0) is charged into the autoclave and further reaction is performed for 2 hours while maintaining the internal pressure at 2.0 Kg/cm² by introducing the mixed gas to the reaction system. Thus, 192 g of a polymer is obtained.

The solid catalyst component has an activity per gram of 27400 g-PP/g-Solid.

The ethylene content of the polymer as measured by infrared spectroscopic analysis is 6.8% by weight. The bulk density of the polymer in powdery form is 0.37 g/cc.

TABLE 1

| | | | Results | | | |
|---|---|---|---|---|---|---|
| Example Nos. | Organomagnesium compound (I) | Chlorosilane compound | Yield of polymer (g) | Catalytic[1] activity (gPP/g-Solid) | Boiling heptane insolubles content (%) | Bulk density (g/cc) |
| 6 | $Mg(sec\text{-}C_4H_9)_{1.2}(O\text{-}iso\text{-}C_6H_{13})_{0.8}$[2] | $HSiCl_2CH_3$ | 204 | 29100 | 96.8 | 0.45 |
| 7 | $ZnMg_{6.0}(n\text{-}C_4H_9)_{9.0}(O\text{-}iso\text{-}C_6H_{13})_{5.0}$[2] | $HSiCl_3$ | 176 | 25100 | 97.5 | 0.43 |
| 8 | $AlMg_{10}(C_2H_5)_{6.0}(n\text{-}C_4H_9)_{9.8}(O-C_8H_{17})_{7.2}$ | $HSiCl_3$ | 188 | 26900 | 97.2 | 0.46 |
| 9 | $Mg(sec\text{-}C_4H_9)_{0.5}(O\text{-}iso\text{-}C_8H_{17})_{1.5}$[3] | $HSiCl_2CH_3$ | 236 | 33700 | 97.8 | 0.39 |
| 10 | $ZnMg_{6.0}(n\text{-}C_4H_9)_{5.0}(O\text{-}iso\text{-}C_6H_{13})_{9.0}$[2] | $HSiCl_3$ | 251 | 35800 | 97.5 | 0.38 |
| 11 | $AlMg_2(C_2H_5)_{0.5}(n\text{-}C_4H_9)_{1.3}(O-C_8H_{17})_{3.2}$ | $HSiCl_3$ | 227 | 32400 | 96.9 | 0.40 |

Note:
[1] Polymer yield/g of solid catalyst component
[2] O-iso-$C_6H_{13}$ represents 2-methyl-1-pentyloxide group
[3] O-iso-$C_8H_{17}$ represents 2-ethyl-1-hexyloxide group

TABLE 2

| | | Results | | | |
|---|---|---|---|---|---|
| Example Nos. | Aromatic carboxylate | Yield of polymer (g) | Catalytic[1] activity (gPP/g-Solid) | Boiling heptane insolubles content (%) | Bulk density (g/cc) |
| 12 | Ethyl benzoate + Di-n-butyl phthalate(1:1) | 220 | 31400 | 96.5 | 0.35 |
| 13 | Diethyl phthalate | 196 | 28000 | 97.0 | 0.38 |
| 14 | Di-iso-propyl phthalate | 206 | 29400 | 96.8 | 0.37 |
| 15 | Di-2-ethylhexyl phthalate | 225 | 32000 | 96.9 | 0.35 |

Note:
[1] Polymer yield/g of solid catalyst component

TABLE 3

| | | | Results | | | |
|---|---|---|---|---|---|---|
| Example Nos. | Organoaluminum compound | Alkoxysilane compound | Yield of polymer (g) | Catalytic[1] activity (gPP/g-Solid) | Boiling heptane insolubles content (%) | Bulk density (g/cc) |
| 16 | Tri-iso-butyl aluminum | Diphenyl dimethoxy silane | 198 | 28300 | 96.5 | 0.36 |
| 17 | Diethyl aluminum hydride | Tetraethoxy silane | 214 | 30600 | 96.9 | 0.33 |
| 18 | Triethyl aluminum + diethyl aluminum chloride (1:1) | Ethyl triethoxy silane | 208 | 29700 | 97.2 | 0.37 |

Note:
[1] Polymer yield/g of solid catalyst component

What is claimed is:
1. A method for producing a stereoregular homopolymer or copolymer of an α-olefin, which comprises homopolymerizing an α-olefin, or copolymerizing an

α-olefin with a comonomer in contact with a catalyst comprising:

(A) a solid catalyst component obtained by contacting, in the presence of a chlorinated hydrocarbon solvent,
  (a) a titanium compound represented by the formula:

$$Ti(OR^5)_m D_{4-m} \quad (I)$$

wherein $R^5$ represents a hydrocarbon residue having 2 to 10 carbon atoms; D represents a halogen atom; and m is a number satisfying the relationship $0 \leq m < 4$, and
  (b) an aromatic carboxylic ester, with
  (c) a solid component having about 0.5 to 1.5 millimoles of Mg—C bond and about 0.5 to 3.0 millimoles of alkoxy group, per gram of the solid component, obtained by reacting
    (i) a hydrocarbon solvent-soluble organomagnesium compound represented by the formula:

$$(M)_\alpha(Mg)_\beta(R^1)_p(R^2)_q(OR^3)_r \quad (II)$$

wherein M represents a metal atom of group I, II or III of the Periodic Table; each of $R^1$, $R^2$ and $R^3$ independently represents a hydrocarbon residue having 2 to 20 carbon atoms; and each of $\alpha$, $\beta$, p, q and r is independently a number satisfying the relationships:

$$0 \leq \alpha, \, 0 < \beta, \, 0 \leq p, \, 0 \leq q, \, 0 < r, \, p+q \neq 0$$

and $k\alpha + 2\beta = p + q + r$ wherein k is the valence of M, with
    (ii) a chlorosilane compound represented by the formula:

$$H_a SiCl_b R^4_{4-(a+b)} \quad (III)$$

wherein $R^4$ represents a hydrocarbon residue having 1 to 20 carbon atoms; and each of a and b is independently a number satisfying the relationships:

$$0 < a, \, 0 < b, \text{ and } a+b \leq 4;$$

(B) an organoaluminum compound represented by the formula:

$$AlR^6_n Z_{3-n} \quad (IV)$$

wherein $R^6$ represents a hydrocarbon residue having 1 to 20 carbon atoms; Z represents a hydrogen atom, a halogen atom, a hydrocarbyloxy group or a siloxy group; and n is a number satisfying the relationship $$0 < n \leq 3; \text{ and}$$

(C) an alkoxysilane compound represented by the formula:

$$R^7_s Si(OR^8)_{4-s} \quad (V)$$

wherein each of $R^7$ and $R^8$ independently represents a hydrocarbon residue having 1 to 20 carbon atoms; and s is a number satisfying the relationship $0 \leq s < 4$.

2. The method according to claim 1, wherein said solid catalyst component (A) obtained from components (a), (b) and (c) is further treated with said titanium compound (a).

3. The method according to claim 1 or 2, wherein $\alpha$, $\beta$ and r in formula (II) satisfy the inequality:

$$0.5 < r/(\alpha+\beta) < 2.2.$$

4. The method according to claim 1 or 2, wherein said chlorinated hydrocarbon solvent is selected from the group consisting of 1,2-dichloroethane, o-dichlorobenzene, n-butyl chloride and mixtures thereof.

5. The method according to claim 1 or 2, wherein M in formula (II) is aluminium or zinc.

6. The method according to claim 1 or 2, wherein $\alpha$ in formula (II) satisfy the relationship:

$$1 \leq \beta/\alpha \leq 20.$$

7. The method according to claim 1 or 2, wherein said titanium compound (a) is titanium tetrachloride.

8. The method according to claim 1 or 2, wherein the proportions of organoaluminum compound (B) and alkoxysilane compound (C) of said catalyst are, respectively, from 1 to 3000 mmol, in terms of the amount of aluminum atom, and from 0.01 to 1000 mmol, in terms of the amount of silicon atom, each per gram of said solid catalyst component (A).

9. The method according to claim 1 or 2, wherein said α-olefin is selected from the group consisting of propylene, butene-1, pentene-1, 4-methyl-pentene-1, 3-methylbutene-1 and mixtures thereof.

10. The method according to claim 1 or 2, wherein said comonomer is ethylene.

* * * * *